United States Patent [19]

Gough

[11] 3,855,121

[45] Dec. 17, 1974

[54] BIOCHEMICAL PROCESS

[76] Inventor: Alfredo A. Gough, 509 Granada, El Paso, Tex. 79912

[22] Filed: May 8, 1972

[21] Appl. No.: 251,056

Related U.S. Application Data

[63] Continuation-in-part of Ser. No. 194,476, Nov. 1, 1971, abandoned, which is a continuation of Ser. No. 5,908, Jan. 26, 1970, abandoned.

[52] U.S. Cl............... 210/11, 210/59, 21/55, 47/1.4, 55/73, 71/8, 252/180, 424/93
[51] Int. Cl............... C02c 1/00, C02c 5/00
[58] Field of Search............... 195/99–103; 210/11, 59, 2, 16, 64; 99/2; 47/1.4, 58; 424/93, 114, 115, 123, 195, 366; 71/8–10, 21; 21/55; 55/73; 252/180

[56] References Cited
UNITED STATES PATENTS

| | | | |
|---|---|---|---|
| 3,093,551 | 6/1963 | Hall | 195/101 X |
| 3,227,648 | 1/1966 | Hahn et al. | 210/11 X |
| 3,362,905 | 1/1968 | Gleave | 210/11 |
| 3,431,675 | 3/1969 | Moore | 210/11 X |
| 3,546,812 | 12/1970 | Kobayashi et al. | 210/11 X |

Primary Examiner—Thomas G. Wyse
Attorney, Agent, or Firm—Clarence O'Brien; Harvey B. Jacobson

[57] ABSTRACT

A biologically active composition is made by first fermenting an aqueous composition of cow manure containing colostrum, together with yeast, calcium carbonate and casein of milk. A portion of the fermented composition is removed, diluted with water and allowed to digest for about five months to form a brilliant green biologically active composition. This composition can be contacted with gaseous or liquid polluted substances to remove the objectionable matter contained therein. This composition can also be contacted with salt water to deactivate the salt contained therein. And finally this composition can also be sprayed on surfaces where insects lay their eggs to prevent the germination of obnoxious insects.

25 Claims, No Drawings

BIOCHEMICAL PROCESS

CROSS-REFERENCE TO RELATED APPLICATIONS

This is a continuation-in-part of application Ser. No. 194,476, filed Nov. 1, 1971, now abandoned, which in turn is a continuation of application Ser. No. 5,908, filed Jan. 26, 1970, now abandoned.

BACKGROUND OF THE INVENTION

This invention relates to a method and composition for eliminating water, air, soil, plant and animal pollution.

This invention further relates to a method and composition for deactivating the salt in salt water.

This invention further relates to a method and composition for controlling and eliminating unwanted insects and other lower animal forms.

This invention further relates to a method and composition for treating various gaseous mixtures to remove noxious components.

Man has become increasingly aware of the quality of his environment. For various reasons, such as air and water pollution, man's environment is less than ideal. Pollution has its source in a variety of places. Water can be contaminated from industrial waste such as sewage or from petroleum by-products. Another familiar form of pollution is smog or that type of air pollution caused by exhaust gases from cars or by industrial processes. Moreover, since air and water come into contact with soil and plant and animal life, these too become polluted. Clear air and water are necessary for the survival of man, as well as for animals and plants. Thus, pollution greatly affects nature in general and therefore is a very important problem.

Another problem making man's environment less than ideal is insects. As is well known by almost everyone, flies and mosquitoes are very obnoxious. Additionally, it is well known that various plant parasites, such as the aphid, ruin millions of trees and plants yearly. Moreover animal and human parasites, such as the common louse, are known to give rise to serious medical and health problems.

Another environmental problem facing mankind is the lack of available water. While this problem has not seriously affected man up to this time, the problem will become increasingly acute as world population grows.

Many attempts have already been made to improve man's environment. Attempts to combat pollution usually involve efforts to chemically or physically filter out the impurities, either before or soon after the polluting substance reaches air or water. Chemical or physical processes have also been used in attempts to desalinate salt water in order to provide abundant supplies of fresh water. Additionally, various chemicals have been employed to control unwanted insects.

While many prior attempts to improve man's environment have met with some success, they are not altogether free of their own drawbacks. For example, chemical treatments of polluted gases and water and chemical processes for the desalination of salt water often introduce their own chemical pollutants into the substance being processed. In addition, physical processes for depollution and desalinization usually require great capital expenditures. Also, chemical processes for insect control introduce their own unwanted chemicals into the environment.

It is an object of this invention to provide a new method and composition for controlling air and water pollution.

It is a further object of this invention to provide a new method and composition for controlling unwanted insects.

It is a further object of this invention to provide a new method and composition for upgrading the properties of salt water so it can be used in place of fresh water in many applications.

It is a further object of this invention to provide a method and composition for accomplishing the above objects which are simple, inexpensive and do not introduce objectionable chemicals into the environment.

SUMMARY OF THE INVENTION

These and other objects are accomplished according to the present invention which is based on the discovery that a properly fermented and digested aqueous composition of cow manure containing colostrum exhibits a unique biological activity enabling it to reduce or eliminate gaseous, liquid and solid pollutants, deactivate the salt contained in salt water and prevent the germination of various insects.

The unique biological composition of this invention is made by a two step process in which an aqueous composition of cow manure containing colostrum is allowed to ferment for at least about 14 days until a milky-green biologically active fluid separates to the top of the composition. The milky-green fluid is then withdrawn, diluted with water and allowed to digest for about 5 months until the biologically active composition of this invention is produced.

The composition of this invention is used to remove pollutants from water by simply mixing it with the polluted water and allowing it to stand for a few days. The composition of this invention is used to upgrade salt water by also simply mixing it with the salt water and allowing the composition to stand for a few days. The composition of this invention is used to remove noxious gases from the air by simply contacting the air or other gas with the composition of this invention. And finally, the composition of this invention is used to control insects by simply spraying it on surfaces where the insect eggs are laid so that the eggs are prevented from germinating.

DETAILED DESCRIPTION

The biological composition of this invention is prepared from cow manure containing colostrum. As is known, cow manure containing colostrum can be obtained from lactating cows. The manure so obtained should be used in the process of this invention before it begins to sour.

The first step of the inventive process involves fermenting an aqueous composition of the colostrum-containing cow manure. In this step, an amount of cow manure and water are added to a container which will allow direct contact of the composition contained therein with natural sunlight and air. Amazingly, it has been found that it is necessary to perform the fermentation step in a tank having a height between about 12 to 16 feet, since the maximum growth of desired microorganisms will occur at the top approximate 14 inches of a fluid having a liquid level of this height. Accordingly, the diameter or length and width of the tank are selected depending on the amount of product that is to be processed, while the height of the container remains within about 12 to 16 feet.

The amount of cow manure containing colostrum added to the digestion tank should be enough to bring the height of the manure in the tank to about 1 to 4 feet, the remainder of the tank volume being filled with water. The biological processes occurring in the fermentation tank are self-regulating to an extent and work best if the amount of cow manure and water added are maintained within the above ranges. If more cow manure is added, the excess will float to the top and be discarded by the system unused. Moreover, if less than this amount is employed, the rate of production of the desired microorganisms will be greatly diminished.

In a preferred embodiment of the invention, the height of the cow manure added is about 2 feet, 10 inches since the operation of the system is maximized with this amount of cow manure.

Since the level of the fluid of the tank should be kept between 12 to 16 feet during the entire fermentation process, it is preferably to continuously add a small amount of water, usually about 250 cc per minute. This not only insures a proper liquid height in the fermentation tank, but also promotes a slight overflowing of the composition in the tank, which in turn helps remove the trashy residues formed during fermentation.

In addition to the cow manure, it is necessary to add various other components to the fermentation tank to ensure the formation of the proper biological microorganisms. Specifically, it has been found necessary to add a quantity of fungus cells, a quantity of protozoa inhibitor, and a quantity of casein of milk.

The fungus cells are preferably obtained in the form of yeast. This component is added to prevent the excrement in the composition from becoming anaerobic. Additionally, it is believed that the yeast is transformed into various alcohols and carbon dioxide which are necessary to promote the formation of the desired microorganisms. The amount of yeast added should be between about 0.2 to 0.52 ounces per square foot of tank bottom surface area. Thus, for example, in a cylindrical tank with a 40 to 48 inch diameter, the amount of yeast added should be about 2½ to 5½ ounces and preferably about 4 ounces. This corresponds to about 1 ounce yeast for every foot or part thereof of tank diameter. Moreover, after the fermentation process has commenced, this amount of yeast should be again repeatedly added during the life of the fermentation process. It has been found that if yeast in the above amounts is added approximately once every 9 days, the production of desired microorganisms is maximized. However, the yeast can be added periodically ranging from once every 7 days to once every 11 days without unduly diminishing the production rate of microorganisms, although the yeast cannot be added more often than every 5 days if a reasonable production of microorganisms is to be obtained.

The protozoa inhibitor may be either calcium carbonate or a mixture of sodium silicate and hydrochloric acid having a volume ratio ranging from about 3 to ⅓ parts sodium silicate per part hydrochloric acid, and preferably about two parts sodium silicate per part hydrochloric acid. When calcium carbonate is used alone, it is simply added to the fermentation tank as a powder.

When the sodium silicate/hydrochloric acid mixture is used, however, the sodium silicate is preferably dissolved in an approximately equal volume of water to form a gel and the hydrochloric acid added thereto before the composition is added to the fermentation tank. The protozoa inhibitor inhibits the formation of protozoa in the fermentation tank and thereby allows the biological plant life to multiply easily with the carbon dioxide furnished from the yeast or other fungus cell source. Accordingly, any other component which inhibits the formation of the protozoa can also be used for this purpose.

Casein of milk is a well-known substance and is added to provide a special white phosphorous component, the exact nature of which is unknown, to the fermentation tank. Interestingly, while this special white phosphorous is also found in eggs, eggs cannot be used to supply this component. Either vitamin containing or vitamin free casein of milk can be used to provide the special white phosphorous compound necessary for the inventive process.

In a preferred embodiment of the invention, calcium carbonate and casein of milk are first premixed and then added together to the tank. If this premixture is used, the weight ratio of the calcium carbonate to casein should range from about 300 to 20 parts calcium carbonate for each part of casein and preferably about 100 to 50 parts calcium carbonate for each part of casein. The amount of premixture added to the fermentation tank shnould be about 0.9 to 1.1 ounce, and preferably about 1 ounce, of premixture for every two feet or part thereof of diameter of a cylindrical tank. If a noncylindrical tank is used, the same proportions of premixture should also be used. The calcium carbonate and casein are added together in premixture form merely for convenience and may be added separately if desired. If added separately, the amount of each component added should correspond to the amount added in the preferred embodiment. Moreover, if a sodium silicate/hydrochloric acid mixture is used in place of calcium carbonate, it should be added in approximately the same amount as the calcium carbonate.

Once the various components have been added to the fermentation tank, the composition is allowed to stand in order to ferment. After a short period of time, a trashy residue begins to float to the surface of the fermentation zone. Because this scummy residue blocks out sunlight and air contact, the trash should be periodically removed from the liquid surface. Accordingly, in a preferred embodiment the trashy residue is removed about twice daily. Moreover, as set forth above, the continuous addition of a small amount of water helps to remove some of this trashy residue since the overflowing fluid carries part of the trash with itself.

After the aqueous composition of manure has been fermenting for about 72 hours, a small amount of cow manure containing colostrum should be added daily. The amount of cow manure added daily is about 1/50 to 1/500 of the amount of cow manure originally placed in the tank and is preferably about 1/100 of the original amount placed in the tank. Additionally, as set forth above, about 9 days after the beginning of the fermentation process, and again after each additional 9 day period, a small amount of yeast is also added to ensure the composition does not become anaerobic and to provide the proper components for forming the desired microorganisms. Moreover, in order to run the fermentation process continuously, the protozoa inhibitor and the casein are added in the foregoing amounts about once every 180 days.

After at least about 14 days, the composition originally placed in the tank has undergone the proper fermentation. At the end of this period, three distinct phases are formed. The lower phase, a sludge phase, is composed predominantly of partly decomposed and fresh manure from the recent daily manure additions. The intermediate phase is a water phase containing aerobic bacteria. The third phase is composed of a milky-green fluid, which floats at the top approximate 14 inches of the fermentation tank. This milky-green fluid is composed of semi-aerobic bacteria, euglena and protozoa and is a product of the fermentation step of this process.

The second step of the process of this invention involves the digestion of the milky-green fluid produced in the first step of the process. In the second step, the milky-green fluid produced in the first step is transferred to a digestion tank which is open to sunlight and air where it is diluted with water. As with the fermentation step of this invention, it has been found that the production of desired microorganisms in the digestion step is maximized at a particular liquid level. Specifically, it has been found that if the digestion tank is selected so that the liquid level in the digestion zone is between about 3 to 7 feet, and preferably 4 to 5 feet, the production of the desired microorganisms is maximized at the top approximate 14 inches of the digestion zone. Accordingly, the size and shape of the digestion tank are selected so that the liquid level always remains within this range.

When the milky-green fluid from the fermentation step is transferred to the digestion tank, the fermentation tank should be essentially free of trash as the milky-green fluid is withdrawn. This prevents the unwanted formation of an anaerobic condition in the digestion tank which is likely to form if this precaution is not taken. Moreover, if the fermentation step is to be carried out continuously, water should be added to the fermentation tank at about the same rate that milky-green fluid is withdrawn. This insures that the liquid level in the fermentation zone is maintained within the proper limits so that the production of the desired microorganisms is maximized.

The amount of milky-green fluid and water added to the second tank should be enough so that the concentration of milky-green fluid ranges from about 0.25 to 4 parts milky-green fluid to 10 parts water, and preferably about 1 part milky-green fluid to 10 parts water. This composition is then allowed to digest or mature to produce the biologically active composition of this invention.

During the digestion process, it is preferable to repeatedly add small amounts of milky-green fluid from the fermentation zone to the digestion zone in order to maximize the production of desired microorganisms. Accordingly, after about three days, about one part milky-green fluid to 20 parts liquid already in the digestion zone is added to the digestion zone. Moreover, this amount of milky-green fluid is repeatedly added once every approximate 7 days, although the period may range from once every day to once every 30 days. Additionally, in a preferred embodiment, a small amount of water, usually about 250 cc per hour, is continuously added to the digestion zone.

During the digestion process, the microorganisms contained in the milky-green fluid mature into more complex animal and plant life forms. This change in life form is reflected by the color changes exhibited by the composition in the digestion tank. Specifically, when the milky-green fluid from the fermentation zone is first diluted with water, it develops a noticeable brownish-green color. The composition remains this color for the first three days of the digestion step until an additional amount of milky-green fluid is added as set forth above. During the next approximate 7 days, or up to 10 days from the start of the digestion step, the composition turns from a brownish to a distinct green color. Additionally, the surface develops a noticeable rainbow effect, which lasts for about 72 hours. After about 20 days from the start of the second step the surface of the composition becomes a brilliant green. The composition in the digestion tank is then allowed to digest or mature for at least about 5 months, and preferably 6 months, from the start of the digestion step, during which time the brilliant green color of the surface liquid layer extend throughout the entire tank.

After 5 months, the digestion step is complete and the biologically active composition of this invention is withdrawn from the digestion zone. As set forth above, the desired micro-organisms are produced at the top approximate 14 inches of the digestion zone of a properly constructed tank, and accordingly, only the brilliant green liquid concentrate located at the top 14 inches of the digest tank is withdrawn.

In this regard, it should be understood that the 5 month digestion period is necessary only to enable the lower forms of plant and animal life contained in the inventive composition to become strong and virile. Thus, the brilliant green liquid at the top of the digestion zone can be withdrawn as early as 20 to 30 days from the start of the digestion process although this product will not be nearly as strong and effective as the product produced by at least 5 month's digestion.

During the withdrawal of the brilliant green liquid concentrate from the digestion zone, an additional amount of milky-green fluid from the fermentation zone is added to the digestion tank so that the digestion process can continue. The amount of milky-green liquid added is about 1 part milky-green fluid for each 15 to 200 parts liquid already in the digestion tank, and preferably about 1 part milky-green fluid to about 20 parts of liquid already in the digestion tank. The withdrawal operation marks a new beginning to the weekly addition cycle of milky-green fluid, and accordingly the next weekly addition of milky-green fluid should be made about 7 days after the previous withdrawal. If too much green liquid concentrate is withdrawn from the digestion tank so that the level of the liquid in the digestion zone is reduced to below the required level, an additional amount of water should be added to raise the liquid level to the proper height.

The biologically active composition of this invention is brilliant green in color and is composed algae, paramecium, aerobic bacteria, fungi, protozoa and other lower animal and plant life forms. These microorganisms are aerobic, autotrophic and faculative.

The composition of this invention has many utilities. For example, it can be simply contacted with polluted water, waste water, human and animal wastes and so forth to reduce or substantially eliminate the objectionable organic material contained therein. By proceeding in this manner, not only can the offensive anaerobic smell of these polluted materials be substantially totally eliminated, but also biodegradation of these compositions can be markedly accelerated. While not wishing to be bound to any theory, it is believed that the biological microorganisms of the inventive composition, and especially the aerobic bacteria contained therein, react with the anaerobic bacteria contained in the wastes to speed the breakdown of the objectionable organic matter.

In treating liquid wastes, pollution and so forth, the amount of green liquid concentrate product added to a given amount of polluted liquid or wastes is not critical. For ordinary domestic sewage, the green liquid concentrate will effectively eliminate its offensive anaerobic smell and speed its biodegradation if added in a ratio of about 1 part green liquid concentrate per 400 parts sewage. However, any amount of green liquid concentrate can be added since it exhibits its beneficial pollution treating effects at any concentration. As expected, the greater the BOD content of the waste water or wastes, the more green liquid concentrate should be added since more biodegradation is necessary to depolute such substances.

The green liquid concentrate product of this invention can also be used to treat air pollution. Specifically, the green liquid concentrate of this invention can effectively remove both sulfur dioxide and hydrogen sulfide from gaseous mixtures containing these components. This can be accomplished by simply contacting the gaseous mixture with the composition of this invention, for example, by running the mixture through a scrubber containing the biological composition of this invention, or by spraying the composition of this invention into the gaseous mixture. Also, the biological composition of this invention can simply be sprayed on the source of the gaseous pollution, such as the surface of the body of water producing these gases in order to eliminate the pollution before it occurs. For example, the biologically active composition of this invention can be added to the wash down waters from a pecan treatment plant or a paper mill to reduce the extremely noxious odors produced therefrom. As is known, these wash down waters contain an amount of tannic acid and produce large quantities of hydrogen sulfide. By adding the composition of this invention to these waters, the harsh hydrogen sulfide odors can be almost totally eliminated.

While the exact mechanism of the gaseous depollution is not known, it is believed that the biological organisms in the green liquid concentrate consume the sulfur dioxide and/or hydrogen sulfide by undergoing a sulfur cycle, in much the same way as plants undergo a nitrogen cycle. The biological organisms in the inventive composition reduce the sulfur of the sulfur dioxide to sulfide and sulfate forms and then further reduce the sulfur to its elemental form. As a result, noxious sulfur dioxide and hydrogen sulfide are eliminated from a gaseous mixture and a by-product of elemental sulfur is produced.

In addition to sulfur dioxide and hydrogen sulfide, it has also been found that the green liquid concentrate product of this invention can remove carbon dioxide from various gaseous mixtures. When used for this purpose, the biological composition of this invention causes the carbon monoxide to react to form carbon dioxide.

The biological composition of this invention can also be used to deactivate the salt contained in salt water, a property characteristic of only a small group of lower plants and animals. It has been found that salt water having a salt content of as much as 87,000 ppm, which is over twice the amount in sea water, can be substantially deactivated so that the resultant product can be used to irrigate crops and feed animals. For example, salt water so treated can be used in growing cotton, corn, beans, squash, sorghum, watermelon, cantaloupe and sudan grass. Moreover, the water can be given to such animals as cows, mules, goats, dogs, rabbits, birds and so forth.

In order to deactivate the salt contained in salt water, the green liquid concentrate product of this invention is simply contacted with the walt water and salt composition allowed to mature for a period of time sufficient for the deactivation to occur. The amount of green liquid concentrate used and the time period for deactivation are not critical but rather depend on the concentration of the salt contained in the original salt water and the desired speed of deactivation. Thus, salt water containing a greater portion of salt requires a correspondingly greater amount of green liquid concentrate, and further, a greater portion of green liquid concentrate in a given amount of salt water causes a correspondingly quicker deactivation.

The biological composition of this invention can also be used to control various obnoxious insects, and specifically those insects whose eggs germinate in a semi-aerobic or anaerobic environment. This is accomplished by spraying or otherwise applying the biologically active composition of this invention to those areas where the insects lay their eggs. For example, the biological composition of this invention can be sprayed onto the surface of a stagnant pond for control of mosquitoes. Or, the composition of this invention, preferably diluted with water, can be sprayed onto trees, bushes, plants, and animals to control such insects as the common household fly, the aphid, the louse, and so forth.

The unusual ability of the biological composition of this invention to control obnoxious insects and parasites is believed to be due to its highly aerobic nature. When the composition is sprayed on the various surfaces where insect eggs germinate, theh semi-aerobic or anaerobic environment is changed to an aerobic environment. Because the eggs of many of obnoxious insects require a semi-aerobic condition to germinate, they are effectively prevented from maturing into insects. Interestingly enough, once the eggs have germinated, the biological composition of this invention is no longer effective as an insect control, since the mature insects live in an aerobic environment.

The biological composition of this invention also has many other utilities. For example, it can be added to the water used in a cooling tower to prevent and remove corrosion. This not only eliminates the need for harsh chemicals but also saves extra water since bleed off of a part of the cooling water is not required. The composition of this invention can also be used to increase the productivity of blooming plants. By simply spraying the inventive composition on plants that are in bloom, the yield of the plants will be increased since more of the blooms will mature into fruit.

The biologically active composition of this invention can also be further digested or matured to produce still other biological compositions having still other utilities. Specifically, the green liquid concentrate product of the invention can be placed in a second digestion tank open to sunlight and air where it is diluted with water and allowed to further mature. As with the first digestion tank, it has been found that the height of the liquid in the second digestion tank should be maintained to within specific limits to maximize the production of the desired microorganisms. Accordingly, the dimensions of the second digestion tank are selected according to the same height requirements as the first digestion tank.

The green liquid concentrate placed in the second digestion tank is originally diluted with roughly nine parts water per part green liquid concentrate. Also, additional green liquid concentrate, or about one part green liquid concentrate for every 20 parts capacity of the second tank, is added weekly, although these repeated additions may range from once every five days to once every nine days. Also, a small amount of water, and preferably about 250 cc per hour, is continuously added. Thus, the original dilution with water, the subsequent weekly additions of green liquid concentrate and continuous addition of a small amount of water are accomplished in the second digestion tank in substantially the same way as in the first digestion tank.

After the 28 days of growth, the liquid in the top 14 inches of the second digestion tank becomes a yellow-green color, odorless and autotrophic. The desired microorganisms are produced in the top 14 inches of the second digestion tank, and accordingly only the liquid in this top level is removed. During removal, an equal amount of water should be added to the second digestion tank so that the second digestion process can be continued.

The yellow-green composition can be used to control the soil nematode. As is known, the soil nematode in a plant parasite which ruins millions of plants yearly. This destruction can be eliminated by contacting the plant soil with the yellow-green biological composition in any concentration, although about one gallon yellow-green concentrate per acre of land has been found to be most suitable. In this regard, the yellow-green composition can be conveniently applied to irrigated soil by mixing about one gallon yellow-green composition with each 200,000 gallons of irrigation water.

It has also been found that the action of the yellow-green composition can be improved if it is mixed with minute amounts, or about 1 to 4,000 grams, and preferably about 4 to 1,000 grams, per gallon yellow-green composition of hydrochloric acid, phosphoric acid or potassium permanganate, before it is applied to the soil. Moreover, if a mixture of these three components is used, adjusting the relative proportional amounts of these components to correspond to one pint hydrochloric acid to about one pint phosphoric acid to about three grains potassium permanganate will produce an especially effective composition.

The yellow-green biologically active composition, which is also highly aerobic, is believed to change the semi-aerobic condition of run down soil back to an aerobic condition. The soil nematode, which lives in a semi-aerobic environment, is thereby driven away from the plant and thus prevented from harming or destroying the plant during its productive cycle. Once the plant has produced its crop, it is turned back under the soil and the soil nematode returns to begin the breakdown of the organic plant matter.

While the brilliant green liquid concentrate product of this invention is the basic reactant used in the second digestion step, it has been found that the green liquid concentrate appearing in the first digestion tank as early as 28 days from the start of the first digestion step can be used for this purpose. Accordingly, if it is desired to produce the double digested yellow-green biologically active composition as early as possible, the green liquid concentrate in the top 14 inches of the first digestion tank can be transferred to the second digestion tank as early as 28 days after the start of the first digestion step.

The yellow-green biological composition produced in the second digestion tank can be even further digested to produce still another composition having still other valuable utilities. This is accomplished by transferring the yellow-green biological composition produced in the second digestion tank to a third digestion tank. However, this transfer should not be accomplished until at least about 90 days after the start of the second digestion step in order to enable the microorganisms in the yellow-green concentrate to fully mature. Moreover, when this transfer is accomplished, an equal amount of water should be added to the second digestion tank so that the second digestion step can continue indefinitely. As with the first and second digestion steps, again it has been found that the height of the liquid in the third digestion tank should be maintained to within particular limits to maximize the production of the desired microorganisms. Accordingly, the dimensions of the third digestion tank are selected according to the same height requirements as the first and second digestion tanks.

In the third digestion tank, the yellow-green biological composition is first diluted with about 1,400 parts water per part yellow-green composition, and the resultant mixture allowed to mature. On the fourth day after the third digestion zone is started, about one part yellow-green liquid from the second digestion tank to each 2,800 parts of liquid in the third digestion tank is added. Also every seventh day thereafter, although the period may range from every fifth day to ninth day, an additional one part yellow-green liquid to each 2,800 parts liquid in the third digestion tank is added. Additionally, a small amount, and preferably 250 cc per hour, of water should be continuously added.

After about four months, the composition in the third digestion tank becomes crystal clear and odorless, and it contains autotrophic and aerobic blue-green algae and bacteria located at the top 14 inches of the tank. The crystal clear fluid is withdrawn from the top 14 inches of the third digestion zone, and if the process is to continue indefinitely, an equal amount of water is added to the third digestion zone to ensure the proper liquid level.

The crystal clear liquid of the third digestion zone can be added to still water or to water in a container to prevent it from becoming stagnant. Additionally, the crystal clear liquid, either alone or added to approximately equal amounts of green liquid concentrate from the first digestion tank and yellow-green composition from the second digestion tank, can be used as a supplement to be added to the water consumed by animals. The supplement causes the animal's food to be further broken down in its stomach making more nutrients available to the animal and further reducing or eliminating the malodor of the animal's excrement.

While the present invention has been thoroughly described above, the following examples are provided to illustrate the method of making and using the composition of this invention.

EXAMPLE 1

Approximately 55 gallons of cow manure containing colostrum are obtained as the excrement of a cow producing milk. The cow manure is added to a 14-feet high fermentation tank of sufficient cross-sectional area to allow the manure a 30 inch depth. The tank is built outdoors and with an open top so that the liquid contained therein is completely open to sunlight and air. The tank is then filled to the top with water. Thereafter, 3 ounces of yeast and 2 ounces of a mixture of calcium carbonate and casein of milk (100 parts calcium carbonate to 5 parts of casein of milk which is pure grade, contains enzymes and is not vitamin-free) are introduced to the system and the habitat is now complete.

The biological system is left standing for 3 days, only cleaning off the trash which rises to the top and adding more water to insure that the tank remains filled to the top. The trash is cleaned off and water added twice daily, in the morning and in the afternoon. In the late afternoon of the fourth day, one Rice shovel of cow manure is added after the trash has been removed and the container then filled full with water. The addition of manure is accompanied by some heat which helps maintain a fixed temperature and accelerates the formation of egulena, semiaerobic bacteria dn protozoa organisms. After the trash is removed in the morning of the ninth day, 3 ounces of yeast are added and then enough water to bring the composition to a full level. This procedure is repeated every 9 days. The calcium carbonate-casein of milk mixture is added every 180 days through the performance of the process. After 3 days from the start of the process, water is continuously added to the tank at a rate of about 250 cc/hr.

During the first 28 days, euglena and protozoa are formed in the top 14 inches of the fermentation tank in a milky-green liquid which is semi-aerobic. The color green in the milky-green liquid indicates the presence of euglena and protozoa. This milky-green liquid is transferred to a digestion tank, 5 feet by 5 feet by 5 feet and having an open top, containing water for the evolving or growing the euglena into algae and protozoa into paramecium, which are aerobic, autotrophic and facultative. When the milky-green liquid is transferred from the top 14 inches of the fermentation tank, water is added to the fermentation tank at the same rate as the milky-green liquid is removed to maintain a full fermentation tank at all times.

The amount of green liquid transferred is 1 part of milky-green liquid to each 10 parts of capacity of the digestion tank, and the remaining volume of the digestion tank is filled with water. Thereafter, approximately 250 cc of water per minute are allowed to enter the digestion tank to maintain a full level. On the fourth day following the first transfer of the milky-green liquid, more milky-green liquid concentrate is transferred from the fermentation tank to the digestion tank. About one part green liquid concentrate for each 20 parts of capacity of the digestion tank is transferred. Transfer of this amount of milky-green liquid is repeated every seven days. After 6 months of growing the aerobic, autotrophic and facultative plants and animals in their lowest form, the composition is a brilliant green and the formation of the biologically active composition of this invention is complete. The composition is withdrawn from the top 14 inches of the digestion tank and is found to contain algae, protozoa, paramecium, aerobic bacteria and other plant and animal microorganisms.

EXAMPLE 2

The green liquid concentrate product of this invention is added to the wash down water of a pecan treatment plant. Prior to the addition of the biological composition, the wash down water exhibited an extremely offensive odor characteristic of hydrogen sulfide. About 1 gallon of green liquid concentrate product of this invention is added to 2,000 gallons of wash down water, and after about 10 minutes, the obnoxious hydrogen sulfide smell is eliminated.

EXAMPLE 3

The biological composition of this invention is used to treat the sewage from a hog farm. A sewage outlet line leads from the hog farm to a pond approximately 1 acre in surface area containing hog farm sewage at a liquid level of about 6 to 8 feet high. The sewage is composed mainly of water and the excrement of hogs and it has a BOD content of over 10,000. Before the test begins, the malodor of the waste is so strong that it can be discerned for distances up to two or three miles from the pond. Moreover, the odor is so strong that it is difficult to approach within less than about 200 yards from the pond.

The surface of the pond is sprayed with about 1,000 gallons of the green liquid concentrate of this invention. Afterwards, green liquid concentrate is added to the incoming sewage at a ratio of about one part green liquid concentrate to 1,600 parts sewage. After about 3 days, the strength of the odor is so decreased that the edge of the pond can be approached without being saturated with odor. Moreover, the BOD content of the waste is measured to be about 300 to 500.

EXAMPLE 4

The green liquid concentrate of this invention is used to deactivate the salt contained in salt water having a salt content of over 87,000 ppm. In this example, two adjoining ponds are constructed, pond A of 40,000 gallon capacity and pond B of 20,000 gallon capacity. Pond A and pond B are joined at the middle so that pond A can flow into pond B and from there to an overflow irrigation ditch. Both pond A and pond B are lined with polyethylene film to stop seepage loss. Located at the end of pond A opposite to the junction with pond B is the salt water supply. A tank C of 5,000 gallon capacity is also placed along one side of pond A with an overflow outlet at full level that will overflow into pond A. A small pump is situated on the edge of pond A next to tank C, and pond A and pond B are filled with salt water from the salt water supply to full level without causing pond B to overflow into the irrigation ditch. Tank C is filled with one part green liquid concentrate and 12 parts salt water, and the salt water is pumped at a continuous flow of one fourth gallon per minute from pond A to the tank. The mixture from the tank overflows at the same rate back into pond A. On the fourth day of continued treatment of pond A and pond B from the tank, one part of green liquid concentrate is added to each 12 parts of capacity of tank C and the excess liquid in tank C is allowed to overflow into pond A and pond B. This process is repeated after seven days. After ten days of growing plant and animal organisms in pond A and pond B, salt water source is continuously pumped at a flow rate of 1,000 gallons per minute into pond A. The salt water overflows from pond A into pond B and from there to the irrigation ditch, and finally to the soil. During this pumping process, the water from pond A is circulated at a rate of one fourth gallon per minute between tank C and pond A. Every 7 days, one part green liquid concentrate is added to each 12 parts of the capacity of tank C during the continued use of this process. Although the salt content of the water pumped to the soil is measured to be the same as the original source, the salt has been deactivated to the extent that the treated water is used to grow cotton, corn, milo, beans, squash, watermelons, grasses, sudan grass and other crops.

While the foregoing process for making the biologically active composition of the invention has been described with reference to a particular time sequence for carrying out the individual process steps, it should be understood that the specific times set forth may vary somewhat as the temperature varies. Thus, in the winter time, and depending on locale, the fermentation and digestion steps may take considerably long to produce the desired micoorganism. However, once the process has reached steady state, the proper timing of the various steps can be determined through trial and error.

The foregoing description and examples have been presented for illustrative purposes only and are not intended to limit the present invention in any way. All reasonable modifications not specifically set forth are intended to be included within the scope of the present invention, which is to be limited only by the following claims.

I claim:
1. A process for making a biologically active composition comprising:
 1. forming in a fermentation zone a liquid composition comprising about 6 to 33% cow manure containing colostrum by volume of said liquid composition, 0.2 to .52 ounces of a fungus cell source per square foot of zone cross-sectional area, 0.003 to 0.052 ounces casein of milk for each 2 feet or part thereof of zone diameter, a protozoa inhibitor in an amount sufficient to inhibit protozoa formation in said zone and water, said liquid composition being maintained at a level of about 12 to 16 feet in height;
 2. allowing said composition to ferment for at least 14 days until a milky-green biologically active composition forms at the top of said liquid composition;
 3. transferring said milky-green composition from said fermentation zone to a first digestion zone;
 4. diluting said composition in the first digestion zone with water to a concentration of 0.25 to 4 parts milky-green composition for each 10 parts water, said diluted composition in said first digestion zone being maintained at a level of about 3 to 7 feet in height;
 5. digesting said diluted milky-green composition for at least 20 days until a brilliant green liquid layer forms at the top of said composition in said first digestion zone; and
 6. removing said brilliant green liquid layer.

2. A process according to claim 1 wherein the fungus cell source is yeast.

3. A process according to claim 1 wherein the protozoa inhibitor is selected from the group consisting of calcium carbonate and a mixture of sodium silicate and hydrochloric acid.

4. A process according to claim 1 wherein the liquid level in said fermentation zone is maintained at about 14 feet in height.

5. A process according to claim 1 wherein the milky-green composition is withdrawn from the top approximate 14 inches of said fermentation zone.

6. A process according to claim 1 wherein the liquid level in said first digestion zone is maintained at about 4 to 5 feet in height.

7. A process according to claim 1 wherein the brilliant green liquid layer is withdrawn from the top approximate 14 inches of said first digestion zone.

8. A process according to claim 1 wherein the diluted fermented composition of step (5) is allowed to digest for at least about 20 days to 6 months.

9. The product of the process of claim 1.

10. A process according to claim 1 further including the steps of:
 7. transferring said brilliant green liquid layer from claim 1 to a second digestion zone;
 8. diluting said liquid in said second digestion zone with water;
 9. digesting the diluted composition of step 8 until an odorless and autotrophic yellow-green biologically active composition is produced; and
 10. withdrawing a portion of the yellow-green composition produced in step (9).

11. A process according to claim 10 further including the steps of:
 11. transferring the yellow-green composition produced in the process of claim 19 to a third digestion zone;
 12. diluting said yellow-green composition with water;
 13. digesting the diluted composition of step (12) until a crystal clear and odorless biologically active composition containing autotrophic and aerobic blue-green algae and bacteria is produced; and
 14. withdrawing a portion of the crystal clear odorless composition from the third digestion zone.

12. A process according to claim 1 wherein the diluted fermented composition of step (5) is allowed to digest for at least about 5 months.

13. A process according to claim 12 wherein the fungus cell source is yeast.

14. A process according to claim 10 wherein said diluted composition of step (8) is allowed to digest for about at least 28 days.

15. A process according to claim 11 wherein said diluted yellow-green composition of the process of claim 19 results from digestion in step (9) for at least 90 days.

16. A process according to claim 15 wherein said diluted yellow-green composition is allowed to digest in said third digestion zone for about 4 months.

17. A process according to claim 10 wherein the fungus cell source is yeast.

18. A process according to claim 10 wherein the protozoa inhibitor is selected from the group consisting of calcium carbonate and a mixture of sodium silicate and hydrochloric acid.

19. A process according to claim 11 wherein the fugus cell source is yeast.

20. A process according to claim 11 wherein the protozoa inhibitor is selected from the group consisting of calcium carbonate and a mixture of sodium silicate and hydrochloric acid.

21. A process, as claimed in claim 3, wherein said casein of milk is present in said fermentation zone in the ratio of 1 part by weight casein for each 20–300 parts by weight protozoa inhibitor.

22. A process, as claimed in claim 3, wherein said fungus cell source is yeast.

23. A process, according to claim 14, wherein the fungus cell source is yeast and the protozoa inhibitor is selected from the group consisting of calcium carbonate and a mixture of sodium silicate and hydrochloric acid.

24. A process, according to claim 16, wherein the fungus cell source is yeast and the protozoa inhibitor is selected from the group consisting of calcium carbonate and a mixture of sodium silicate and hydrochloric acid.

25. A process for treating polluted liquid substances to reduce the content of objectionable organic matter contained therein and reduce the obnoxious smell therefrom comprising contacting the polluted substance with the product of the process of claim 1.

* * * * *